United States Patent Office 3,445,396
Patented May 20, 1969

3,445,396
METHOD OF MAKING SYNTHETIC RESINS ANTISTATIC AND ANTISTATIC AGENT COMPOSITION THEREFOR
Makoto Funatsu, Wakayama-shi, and Yasuhiro Torimae, Wakayama, Japan, assignors to Kao Soap Co., Ltd., Tokyo, Japan
No Drawing. Filed Jan. 5, 1967, Ser. No. 607,370
Claims priority, application Japan, Jan. 14, 1966, 41/2,048
Int. Cl. C08k 1/44; C08f 29/18, 29/04
U.S. Cl. 260—92.8          4 Claims

ABSTRACT OF THE DISCLOSURE

An antistatic composition for incorporation in synthetic resins, said composition comprising a mixture of two compounds represented by the following formulas:

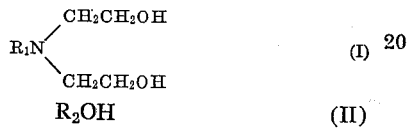

$$R_2OH \qquad (II)$$

wherein each of $R_1$ and $R_2$ is an alkyl or alkenyl group of 8 to 22 carbon atoms.

---

This invention relates to a method of preventing the accumulation of charges of static electricity in synthetic resins, such as polyethylene, polypropylene or soft vinyl chloride resin, by incorporating therein an antistatic agent composition. More particularly the present invention relates to a method, as aforesaid, characterized by using an antistatic agent composition comprised of a mixture of two kinds of compounds represented by the following general formulas:

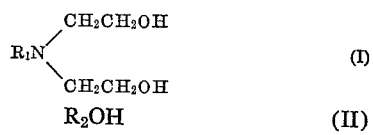

$$R_2OH \qquad (II)$$

wherein each of $R_1$ and $R_2$ is an alkyl or alkenyl group of 8 to 22 carbon atoms. Further, the present invention relates to an antistatic agent composition comprised of the above two kinds of compounds (I) and (II).

It is necessary that any antistatic agent for synthetic resins should have an antistatic property and at the same time should not impair properties inherently required of plastics, such as an antiblocking property and printability. However, there has been found no antistatic agent satisfying all these requirements.

For example, the tertiary amine of the above Formula I having a hydroxyethyl group has an antistatic effect. When a synthetic resin containing said amine is made as a film, the film will have a blocking property. When the resin is molded, the molding will tend to be sticky on the surface.

As a result of making researches to improve this point, the present inventors have discovered that, when a proper amount of a higher alcohol having the above-mentioned Formula II is added to the tertiary amine represented by the above-mentioned Formula I, the blocking property and stickiness will be rectified and the antistatic effect will be synergistically improved. The influence on the antistatic effect resulting from the mutual action of the above-mentioned two kinds of compounds is theoretically so complicated that is has not been definitely elucidated, but the following example can be shown.

As antistatic agent compositions according to the present invention in which each of $R_1$ and $R_2$ is an alkyl group of 18 carbon atoms, there were prepared mixtures of octadecyl dihydroxyethylamine (1) and octadecyl alcohol (2). The relations between the mixing ratios and the antistatic property of the compositions, in the case when 0.2% of the antistatic agent was added to a polyethylene (Showlex 5003 produced by Japan Olefin Company, Ltd.), were measured. The results were as shown in Table I.

TABLE I

| Percent of (2) in the mixture: | Surface resistivity (in Ω) [1] |
|---|---|
| 0 | $2 \times 10^{14}$ |
| 10 | $4 \times 10^{13}$ |
| 20 | $3 \times 10^{12}$ |
| 50 | $5 \times 10^{10}$ |
| 70 | $2 \times 10^{12}$ |
| 80 | $10^{15}$ |
| 100 | $>10^{17}$ |

[1] The surface resistivity was measured by using an oscillation capacity type very high resistance measuring device.

As seen in Table I, when octadecyl alcohol was mixed with octadecyl dihydroxyethylamine, the antistatic effect increased synergistically. When the mixing ratio was about 50:50, the maximum antistatic effect was shown.

This tendency is seen also in the combination of a tertiary amine (I) having another alkyl group with a higher alcohol (II).

The alkyl (or alkenyl) dihydroxyethylamines and the higher alcohols to be used in the present invention are selected from among those having alkyl (or alkenyl) groups of 8 to 22 carbon atoms. Those having alkyl (or alkenyl) groups of not more than seven carbon atoms are so low in their boiling points as to be likely to evaporate while being incorporated into the resin. Those of 23 carbon atoms or more are so difficult to industrially acquire as raw materials that they are not desirable.

Examples of compounds of the above Formulas I and II which are particularly suitably used for the present invention are those in which each of $R_1$ and $R_2$ is capryl, decyl, lauryl, myristyl, cetyl, stearyl or oleyl.

The amount of the higher alcohol of the Formula II mixed with the tertiary amine of the above-mentioned Formula I should be not more than 70% by weight of the mixture. The lower limit thereof is not critical. But, when the antiblocking property is taken into consideration, a particularly excellent effect will be obtained when the higher alcohol comprises from 20 to 70% of the weight of the mixture.

Further, the amount of this mixture added to the synthetic resin is generally about 0.05 to 1.0% by weight and is different depending on the kind of the synthetic resin and the molding method. In general it is sufficient to use about ½ the amount used when only the tertiary amine of the Formula I is employed for obtaining the antistatic property. The addition of such a small amount of the antistatic composition according to the present invention will reduce the undesirable influence of the addition of the antistatic agent on the physical properties of the synthetic resin.

The synthetic resin to which the antistatic agent of the present invention has been added can be made into any molding, sheet and film by using any of the ordinary processes such as, for example, pressing, injection molding, blow molding and extrusion molding.

The antistatic method of the present invention is very easy to practice. For example, the antistatic agent composition can be mixed into pellets in processing the synthetic resin and any kind of product can be obtained by using any kind of molding machine. Alternatively the agent can be mixed into the raw material from which the pellets are made and then the pellets containing the antistatic agent may be molded.

The product obtained according to the present invention shows an antistatic effect irrespective of the form of the product. For example, even when such a product is strongly rubbed with a blanket and is then held above cigarette ash, no ash will be deposited on it. Further, electric shocks caused by static electricity in producing a film at a high speed can also be prevented. In the present invention, owing to the fact that the antistatic agent is incorporated in the synthetic resin, the antistatic property is permanent, the deposition of dust by static electricity while the product is stored can be eliminated and, even when the products are stored in piles, they will not block or adhere together.

Examples of the present invention shall be given in the following. In the examples, the antistatic effect is represented by the value of the surface resistivity at a temperature of 25° C. and at a relative humidity of 56%, and measured with an oscillation capacity type very high resistance measuring device.

EXAMPLE 1

0.2 part of a mixture of stearyl dihydroxyethylamine and stearyl alcohol, at a weight ratio of 1:1, was uniformly mixed with 100 parts of a polyethylene (Showlex No. 5003 produced by Japan Olefin Chemicals Company, Ltd.), by kneading with heated rolls for 10 minutes. The mixture was hot-pressed at 170° C. for three minutes to obtain a polyethylene sheet A. A polyethylene sheet B was obtained by the same method without adding the above-mentioned mixture. A polyethylene sheet C was obtained by the same method by adding 0.2 part of stearyl dihydroxyethylamine without the addition of stearyl alcohol. Their respective antistatic properties were comparatively measured with the results listed in the following table. The sheet A of the present invention was of excellent quality.

| | Surface resistivity | Test of deposition of cigarette ash |
|---|---|---|
| A | $10^{11} \Omega$ | No ash was deposited at all. |
| B | $10^{17} \Omega$ | Much ash was deposited. |
| C | $10^{14} \Omega$ | Some ash was deposited. |

EXAMPLE 2

0.1 part of a mixture of lauryl dihydroxyethylamine and stearyl alcohol, at a weight ratio of 1:1, was added to 100 parts of a polyethylene (Sumikathene F702–2 produced by Sumitomo Chemical Company, Ltd.). An inflation film D was made from the mixture by using an extruder. An inflation film E was obtained by the same method without adding the above-mentioned mixture. A polyethylene inflation film F was obtained by the same method by adding 0.1 part of lauryl dihydroxyethylamine without the addition of stearyl alcohol. Their respective antistatic properties were comparatively measured with the results listed in the following table. The film D of the present invention was of excellent quality.

| | Surface resistivity | Test of deposition of cigarette ash |
|---|---|---|
| D | $10^{11} \Omega$ | No ash was deposited at all. |
| E | $10^{17} \Omega$ | Much ash was deposited. |
| F | $10^{14} \Omega$ | No ash was deposited at all. |

The amount of lauryl dehydroxyethylamine used in the case of the film D was ½ that used in the case of the film F. Further, the film F was so low in the antiblocking property that the mouth of the inflation film was hard to open and the film tended to be sticky on the surface. But the film D showed no such tendency at all.

EXAMPLE 3

Instead of the stearyl dihydroxyethylamine-stearly alcohol (1:1) agent used in Example 1, there were used tertiary amines of the Formula (I) in which the alkyl groups were octyl ($C_8$), dodecyl ($C_{12}$) and oleyl ($C_{\Delta 18}$)

groups and higher alcohols of Formula (II) of octyl ($C_8$), decyl ($D_{10}$), dodecyl ($C_{12}$), hexadecyl ($C_{16}$) and octadecyl ($C_{18}$) groups. Surface resistivities using such mixtures (1:1) in such combinations as are listed in the following table were measured with the results shown in the table.

| $R_1$ | $R_2$ | | | | | |
|---|---|---|---|---|---|---|
| | $C_8$ | $C_{10}$ | $C_{12}$ | $C_{16}$ | $C_{18}$ | $C_{01}$ |
| $C_8$ | $10^{12}$ | $10^{12}$ | $10^{11}$ | $10^{11}$ | $10^{11}$ | $10^{14}$ |
| $C_{12}$ | $10^{11}$ | $10^{11}$ | $10^{11}$ | $10^{10}$ | $10^{10}$ | $10^{13}$ |
| $C_{\Delta 18}$ | $10^{13}$ | $10^{12}$ | $10^{12}$ | $10^{11}$ | $10^{11}$ | $10^{15}$ |

[1] $C_0$ shows the result when the higher alcohol of the Formula (II) was not mixed in, that is, when only the tertiary amine of the Formula (I) was used.

As shown in the above table, according to the present invention, the antistatic effect was remarkably improved and no blocking property was shown in each case.

The embodiments of the invention in which an exclusive property or privilege is claimed are defined as follows:

We claim:

1. An antistatic synthetic resin composition comprising (a) a synthetic resin selected from the group consisting of polyethylene, polypropylene and polyvinyl chloride and (b) a mixture of a dihydroxyethylamine of the formula:

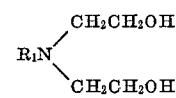

and a higher aliphatic alcohol of the formula:

wherein each of $R_1$ and $R_2$ is selected from the group consisting of alkyl and alkenyl of 8 to 22 carbon atoms, the ratio of said dihydroxyethylamine to said higher alcohol in said mixture being from 8:2 to 3:7 by weight and the amount of said mixture contained in said synthetic resin being from 0.5 to 1.0% by weight.

2. The antistatic synthetic resin composition according to claim 1, in which each of $R_1$ and $R_2$ is selected from the group consisting of capryl, decyl, lauryl, myristyl, cetyl, stearyl and oleyl.

3. An antistatic agent composition for synthetic resins, comprising a dihydroxyethylamine of the formula:

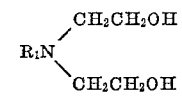

and a higher aliphatic alcohol of the formula:

wherein each of $R_1$ and $R_2$ is selected from the group consisting of alkyl and alkenyl of 8 to 22 carbon atoms, the ratio of said dihydroxyethylamine to said higher alcohol being from 8:2 to 3:7 by weight.

4. The antistatic agent composition according to claim 3, in which each of $R_1$ and $R_2$ is selected from the group consisting of capryl, decyl, lauryl, myristyl, cetyl, stearyl and oleyl.

References Cited

UNITED STATES PATENTS 3,025,257  3/1962  Coler et al.

FOREIGN PATENTS 210,036  3/1956  Australia.

MORRIS LIEBMAN, Primary Examiner.

L. T. JACOBS, Assistant Examiner.

U.S. Cl. X.R.

260—32.6, 33.4, 93.7, 94.9